United States Patent [19]

Maruyama et al.

[11] Patent Number: 4,816,859
[45] Date of Patent: Mar. 28, 1989

[54] ZOOM LENS FOCUSING APPARATUS

[75] Inventors: Takashi Maruyama; Osamu Watanabe; Hidehiko Kitahara; Tomoo Fujimori; Akihiko Soya; Katsuhiko Ootsuki, all of Nagano, Japan

[73] Assignee: Chinon Kabushiki Kaisha, Nagano, Japan

[21] Appl. No.: 174,225

[22] Filed: Mar. 28, 1988

[51] Int. Cl.[4] .................................................. G03B 3/00
[52] U.S. Cl. ..................................... 354/400; 354/402; 354/195.1
[58] Field of Search ...................... 354/400, 402, 195.1, 354/453

[56] References Cited

U.S. PATENT DOCUMENTS

| 4,697,891 | 10/1987 | Kawai | 354/402 |
| 4,705,380 | 11/1987 | Yamamoto et al. | 354/402 |
| 4,728,980 | 3/1988 | Nakamura et al. | 354/402 |
| 4,748,509 | 5/1988 | Otake et al. | 354/400 |

FOREIGN PATENT DOCUMENTS 52-114321  9/1977  Japan .
57-186872 11/1982  Japan .

Primary Examiner—Russell E. Adams
Attorney, Agent, or Firm—Birch, Stewart, Kolasch & Birch

[57] ABSTRACT

A zoom lens focusing apparatus for a camera includes a zoom ring for adjusting a zoom lens section of the camera to different magnifications by moving a movable lens assembly therein forward and backward. A cam mechanism couples the zoom ring to the movable lens assembly, so that a change in the focal length of the zoom lens section caused by rotation of the zoom ring, is a logarithmic function of the angle of rotation of the zoom ring. A master lens section of the camera also has a movable lens assembly therein which is movable forward and backward by a driving device. The position of the zoom ring is detected while the movable lens of the zoom lens section moves backward or forward, and a sampling pulse generating circuit produces a pulse corresponding to the position of the zoom ring. A voltage which changes corresponding to the distance of the subject from the camera is applied to a charge-and-discharge circuit and the output thereof is held in a sample and hold circuit. The driving device is driven by the output held to drive the movable lens assembly of the master lens section to thereby attain focusing.

3 Claims, 7 Drawing Sheets

ZOOM LENS FOCUSING APPARATUS

BACKGROUND OF THE INVENTION

1. Field of the Invention

The present invention relates to a zoom lens focusing apparatus in a camera or the like.

2. Description of Related Art

In a zoom lens in which focusing is accomplished by moving a movable lens in a master lens section, a focal position of the master lens section moves when the magnification is changed in a zoom lens section even if a subject distance is constant. Therefore, in order to maintain this focal position constant, it is necessary to calculate the focal length so as to automatically correct the position of the movable lens of the master lens section. To this end, for example, as disclosed in Japanese Patent Unexamined Publication No. 57-186872, Japanese Patent Unexamined Publication No. 52-114321, and so on, there is provided a moving-range calculating circuit in which positional information of the movable lens of the master lens section depending on the focal length as well as the subject distance is incorporated therein in the form of a calculation formula or a table so that the focal length is calculated to thereby correct the position of the movable lens. Generally, a digital circuit is used to hold the positional information in the form of a calculation formula or a table.

When the digital circuit is used, however, the precision of control is influenced by the resolution of an analog-to-digital converting circuit and a digital-to-analog converting circuit. In that case, if the resolution is made high the converting circuits become complicated, while if the resolution is made low on the contrary it becomes impossible to perform continuous control so that the picture becomes poor. In an automatic focus control mode, generally, it seldom occurs that the picture becomes poor since information concerning the focal length and the aperture is put in a servo loop so as to achieve focusing as a whole. In manual focusing, on the contrary, since no correction means is provided, there is a marked tendency that the picture becomes poor. Moreover, the converting circuits are low in stability and can not be simplified.

SUMMARY OF THE INVENTION

It is therefore an object of the present invention to solve the foregoing problems in the related art.

It is another object of the present invention to provide a zoom lens focusing apparatus which is simple in construction and accurate in operation.

The foregoing objects of the present invention are attained by a zoom lens focusing apparatus which comprises: a zoom lens section (A) including a cam mechanism (C) arranged to be rotatable to thereby move a movable lens forward or backward, and a zoom ring (14) for rotating the cam mechanism (C), the cam mechanism (C) being arranged so that a rotating angle of the zoom ring (14) is a logarithmic function of a focal length; a master lens section (B) provided with a driving section (23) for moving the movable lens forward or backward; a charge-and-discharge circuit (70), voltage source means for applying a voltage to said charge-and-discharge circuit which changes corresponding to information related to a subject distance; a sampling pulse generating circuit (60) for producing a sampling pulse at times which change corresponding to the position of the zoom ring (14); and a sample-and-hold circuit (78) for holding in an output voltage of the charge-and-discharge circuit (70) in response to the time of occurrence of the sampling pulse and for controlling the driving section (23) of the master lens section (B) by the output voltage of the charge-and-discharge circuit (70).

In the apparatus according to the present invention, the cam mechanism (C) is rotated by rotating the zoom ring (14), and the movable lens of the zoom lens section (A) is moved forward or backward by the cam mechanism (C). At this time, since the zoom ring (14) is graduated in a logarithmic function of the focal length of the zoom lens section (A) by the cam mechanism (C), the movable lens moves forward or backward in accordance with the logarithmic function relative to the rotation of the zoom ring (14). The position of the zoom ring (14) is detected while the movable lens of the zoom lens section (A) moves forward or backward, and the sampling pulse generating circuit (60) produces a pulse corresponding to the position of the zoom ring (14). A voltage which changes corresponding to the subject distance information is applied to the charge-and-discharge circuit (70) and the output of the charge-and-discharge circuit (70) which changes by discharge is held. The driving section (23) is driven by the held output to drive the movable lens of the master lens section (B) to thereby attain the focusing.

BRIEF DESCRIPTION FOR THE DRAWINGS

Other features and advantages of the present invention will be apparent from the following description taken in connection with the accompanying drawings, wherein.

DETAILED DESCRIPTION OF THE PREFERRED EMBODIMENTS

An embodiment of the present invention will be described with reference to the drawings.

Figure 2:
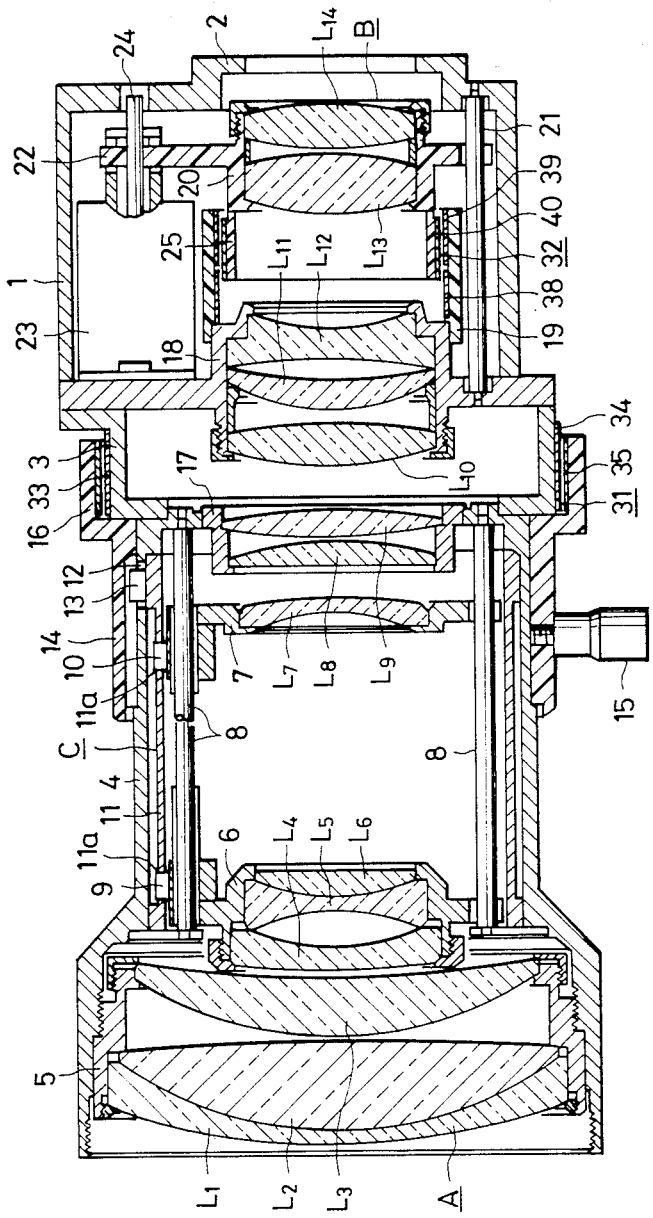
FIG 2 is a longitudinal sectional view of the apparatus.

In FIG. 2, a cylindrical base tube 1 is provided, at its rear portion, with a support portion 2 arranged to be connected to a camera body through an adapter or the like. A cylindrical barrel 4 is attached to the front portion of the base tube 1 through a cylindrical fixed tube 3. A first lens group consisting of first, second an third lenses $L_1$, $L_2$ and $L_3$ is provided in the inside front portion of the barrel 4 through a first lens-group frame 5. Further, a second lens group acting as a variator and consisting of fourth, fifth and sixth lenses $L_4$, $L_5$ and $L_6$, and a third lens group acting as a compensator and consisting of a seventh lens $L_7$ are provided inside the barrel 4 respectively through a second lens-group frame 6 and a third lens-group frame 7 so as to be movable forward or backward in the axial direction. That is, the second lens-group frame 6 and the third lens-group frame 7 are supported movably forward or backward by a plurality of guide shafts 8 provided in parallel to each other at the inside upper and lower portions of the barrel 4. Engagement members 9 and 10 are provided so as to project from the upper sides of the second and third lens-group frames 6 and 7 respectively. The respective engagement members 9 and 10 are engaged with cam grooves 11a and 11b of a cylindrical cam tube 11 rotatably provided inside the barrel 4 concentrically therewith. An engagement member 13 is provided on the upper side of the cam tube 11 so as to project out from an aperture 12 circumferentially formed in the barrel 4. A cam mechanism C is constituted by the cam tube 11 and the cam grooves 11a and 11b. A cylindrical zoom ring 14 is rotatably provided on the outer circumference of the rear of the barrel 4 concentrically therewith. The engagement member 13 of the cam tube 11 engages the interior of the zoom ring 14. A zoom lever 15 is provided on the outside of the zoom ring 14, and a cylindrical movable tube 16 is formed at the rear portion of the zoom ring 14 integrally therewith so as to face the outer circumference of the fixed tube 3.

Further, the cam grooves 11a and 11b are formed so that the rotating angle $\theta$ of the zoom ring 14 is a logarithmic function of the focal length as follows:

$$\theta = F \log f - G$$

where f represents a focal length, and F and G represent constants.

If the zoom ring 14 is rotated by the zoom lever 15, the cam tube 11 is rotated though the engagement member 13 engaged with the zoom ring 14 to move the second and third lens-group frames 6 and 7 forward or backward in the axial direction along the guide shafts 8 through the engagement members 9 and 10 engaged with the cam grooves 11a and 11b of the cam tube 11, so that the lenses $L_4 \sim L_7$ of the second and third lens groups acting as movable lenses are moved forward or backward.

A fourth lens group consisting of eighth and ninth lenses $L_8$ and $L_9$ is provided at the inside rear portion of the barrel 4 though a fourth lens-group frame 17.

A fifth lens group consisting of tenth, eleventh and twelfth lenses $L_{10}$, $L_{11}$ and $L_{12}$ is provided at the inside front portion of the base tube 1 though a fifth lens-group frame 18, and a cylindrical fixed tube 19 is provided at the rear portion of the fifth lens-group frame 18. Moreover, a sixth lens group consisting of thirteenth and fourteenth lenses $L_{13}$ and $L_{14}$ is provided inside the base tube 1 through a sixth lens-group frame 20 so as to be movable forward or backward in the axial direction. That is, the sixth lens-group frame 20 is supported by a guide shaft 21 provided inside the base tube 1 so as to be movable forward or backward, and an actuating portion 22 is provided so as to project up from the upper side of the sixth lens-group frame 20. The actuating portion 22 is connected to a drive shaft 24 of a linear motor 23 which is provided as a driving section, and a movable tube 25 is provided on the front portion of the sixth lens-group frame 20 integrally therewith so as to face the interior of the fixed tube 19.

Thus, if the linear motor 23 is driven so as to move the drive shaft 24 thereof forward or backward, the sixth lens-group frame 20 is moved forward or backward in the axial direction along the guide shaft 21 through the actuating portion 22 so that the lenses $L_{13}$ and $L_{14}$ of the sixth lens group acting as a movable lens are moved forward or backward.

The first through ninth lenses $L_1 \sim L_9$ constitute a zoom lens section A, and the tenth through fourteenth lenses $L_{10} \sim L_{14}$ constitute a master lens section B.

A zoom ring position detecting device 31 is provided between the base tube 1 and the zoom ring 14, and a master lens position detecting device 32 is provided between the fixed tube 19 of the base tube 1 and the sixth lens-group frame 20.

Figure 3:
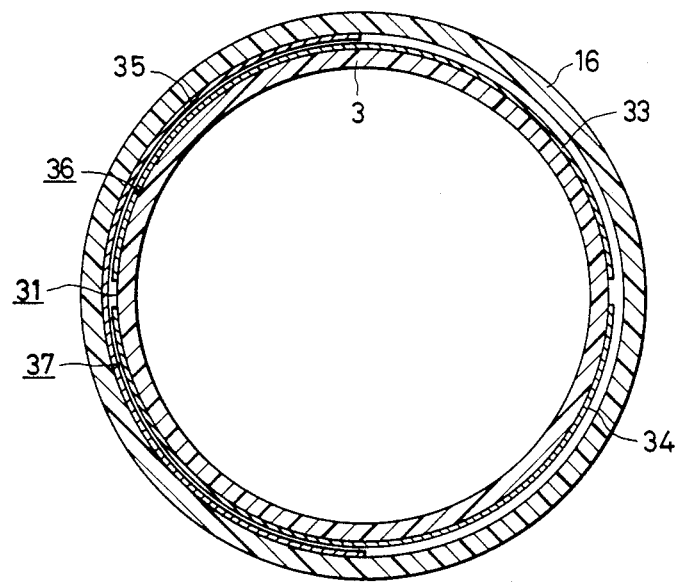
FIG. 3 is a sectional view of a part of FIG. 2.

In the zoom ring position detecting device 31, as shown in FIG. 2 and FIG. 3, a pair of electrodes 33 and 34 each having a circumferentially semicircular cross section are attached on the outer circumference of the fixed tube 3 in front of the base tube 1 so as to be circumferentially adjacent to and insulated from each other, and an electrode 35 having a circumferentially substantially semicircular cross section and having a length equal to or larger than the rotating distance of the zoom ring 14 is attached on the inner circumference of the movable tube 16 at the rear portion of the zoom ring 14. The electrodes 33 and 34 of the fixed tube 3 face the electrode 35 through a slight gap so as to thereby form two variable capacitors 36 and 37.

Figure 4:
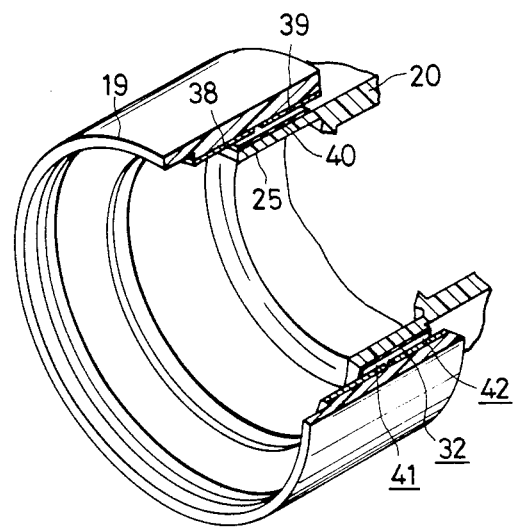
FIG. 4 is a perspective view of a part of FIG. 2.

In the master lens position detecting device 32, as shown in FIGS. 2 and 4, a pair of cylindrical electrodes 38 and 39 are attached on the inner circumference of the fixed tube 19 at the inside front portion of the based tube 1 so as to be axially adjacent to and insulated from each other, and a cylindrical electrode 40 having a width equal to or larger than the moving amount of the sixth lens-group frame 20 is attached to the outer circumference of the movable tube 25 in front of the sixth lens-group frame 20. The electrodes 38 and 39 of the fixed tube 19 are arranged to face the electrode 40 of the movable tube 25 through a slight gap so as to thereby form two variable capacitors 41 and 42.

Figure 1:
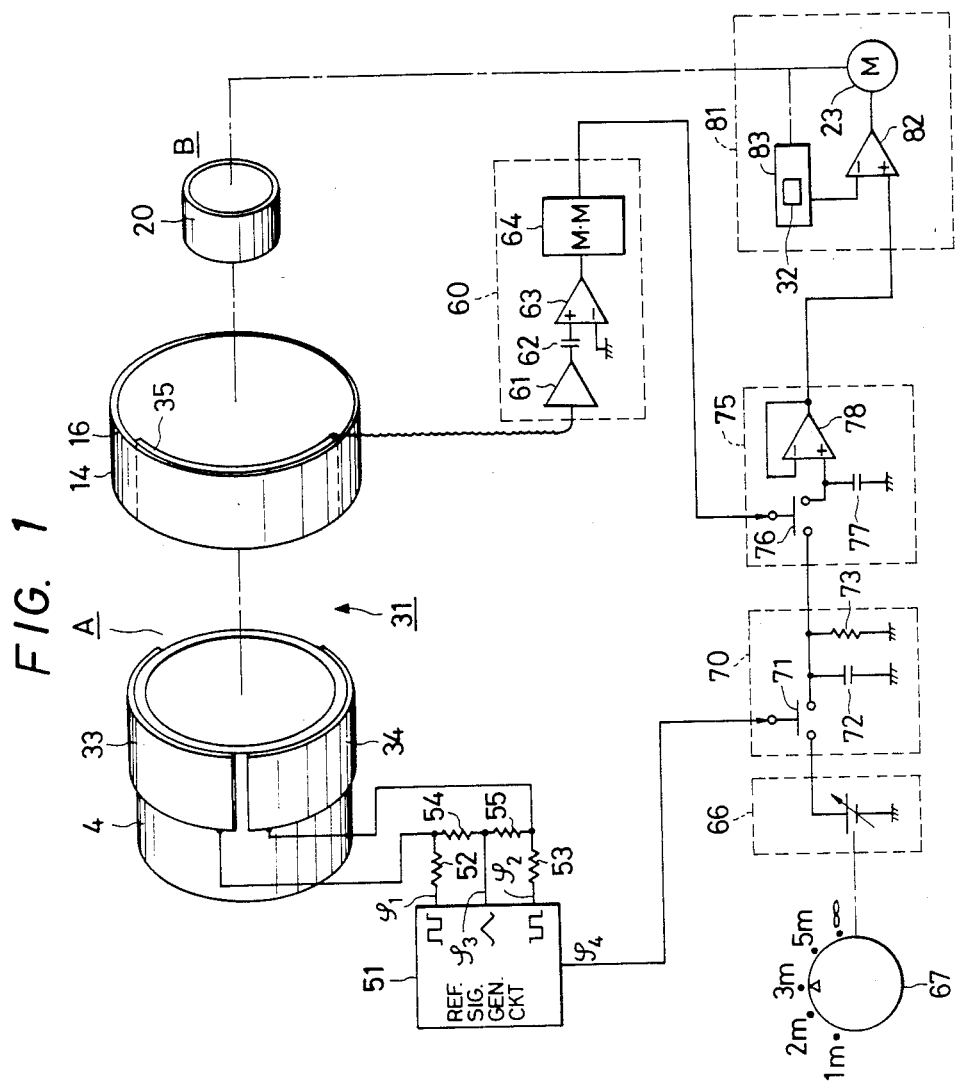
FIG. 1 is a diagram showing a zoom lens focusing apparatus according to an embodiment of the present invention.

In FIG. 1, a reference signal generating circuit 51 is provided to generate square waves $\phi_1$ and $\phi_2$ which are opposite in polarity to each other, a triangular wave $\phi_3$, and a timing pulse $\phi_4$. In the reference signal generating circuit 51, an output terminal for the square wave $\phi_1$ is connected to the one inside electrode 33 of the zoom ring position detecting device 31 through a resister 52, an output terminal for the square wave $\phi_2$ is connected to the other inside electrode 34 of the zoom ring position detecting device 31 through a resister 53, and an output terminal for the triangular wave $\phi_3$ is connected to the electrodes 33 and 34 through respective resisters 54 and 55 respectively. A sampling pulse generating circuit 60 is connected to the outer electrode 35 of the zoom ring position detecting device 31. In the sampling pulse generating circuit 60, an output terminal of an amplifier 61 is connected, through a capacitor 62, to a normal input terminal of an operational amplifier 63 constituting a zero crossing comparator, an inverse input terminal and an output terminal of the operational amplifier 63 being grounded and being connected to a monostable multivibrator 64 respectively.

A variable voltage source 66 the output of which can be varied by a length setting means 67 is connected to a charge-and-discharge circuit 70. The charge-and-discharge circuit 70 is constituted by a capacitor 72 and a resister 73 which are connected in parallel to each other, one and the other ends of the parallel connection being connected to the variable voltage source 66 through a switch 71 and to the ground. The output terminal for the timing pulse $\phi_4$ of the reference signal generating circuit 51 is connected to the switch 71 so that the switch 71 is closed by the timing pulse $\phi_4$. The charge-and-discharge circuit 70 is connected to a sample-and-hold circuit 75. The sample-and-hold circuit 75 is constituted in the form of a voltage follower by an operational amplifier 78 having a normal input terminal connected to the charge-and-discharge circuit 70 through a switch 76 and connected to the ground through a holding capacitor 77 and having an inverse input terminal connected to an output terminal thereof. The sampling pulse generating circuit 60 is connected to the switch 76 so that the switch 76 is closed by the sampling pulse.

The sample-and-hold circuit 75 is connected to a lens driving circuit 81 constituted by an operational amplifier 82, a sensor 83 for producing a voltage output corresponding to he position of the master lens section B, and the foregoing driving section 32 for driving the master lens section B. The operational amplifier 82 has a normal input terminal connected to the sample-and-hold circuit 75, and inverse input terminal connected to the master lens position detecting device 32 constituting the sensor 83, and an output terminal connected to the driving section 23. The lens driving circuit 81 forms a servo system for moving the master lens section forward or backward till the output voltage of the sample-and-hold circuit 75 is equal to that of the master lens position detecting device 32.

Figure 5:
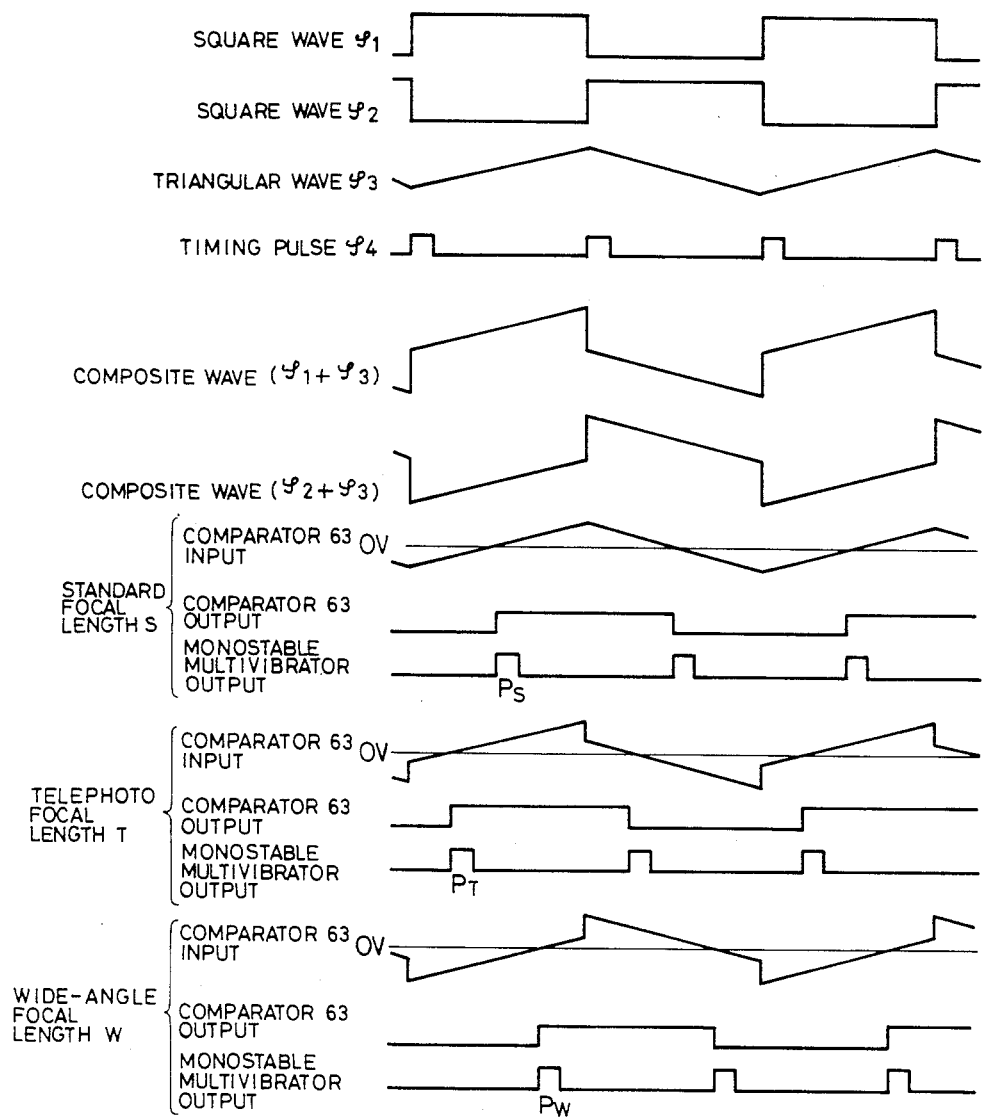
FIG. 5 is a timing diagram showing waveforms in the circuit of FIG. 1.

Referring to FIG. 5 now, the operation of the apparatus of the embodiment will be described hereinafter.

A picture of a subject is imaged on a film (image pick-up plane) of a camera body through the lenses $L_1$ to $L_{14}$ of the first to sixth groups.

In taking a picture, first, the zoom ring 14 is rotated so as to move the second and third lens groups forward or backward so that the fourth, fifth, sixth and seventh lenses $L_4$, $L_5$, $L_6$ and $L_7$, which are movable ones of the zoom lens section A, are moved forward or backward to thereby change the magnification. At this time, the zoom ring position detecting device 31 is actuated. Specifically, when the zoom lens is positioned at a standard focal length S, that is, at the center of displacement, the respective opposite areas of the pair of electrodes 33 and 34 of the fixed tube 3 to the electrode 35 of the movable tube 16 of the zoom ring 14 are equal to each other, so that the pair of variable capacitors 36 and 37 are equal in capacitance to each other. In this condition, if the electrode 35 is rotated as the movable tube 16 of the zoom ring 14 is rotated, the respective opposite areas of the pair of electrodes 33 and 34 of the fixed tube 3 are changed relatively to each other. For example, if the magnification is made to be larger than as it was so as to establish a telephoto focal length T, the capacitance of the one variable capacitor 36 is increased while the capacitance of the other variable capacitor 37 decreased. On the contrary, if the magnification is made to be smaller than as it was, for example, to establish a wide-angle focal length W, the capacitance of the one variable capacitor 36 is decreased while the capacitance of the other variable capacitor 37 is increased. Thus, the pair of variable capacitors 36 and 37 are changed in capacitance in response to the displacement of the second and third lens groups, and those changes in capacitance are derived as positional information of the second and third lens groups. When the second and third lens groups are moved by rotation of the zoom ring 14 in order to change the magnification of the zoom lens, the moved positions of the second and third lens groups are outputted by the zoom ring position detecting device 31.

At that time, the reference signal generating circuit 51 supplies a composite wave $\phi_1+\phi_3$ of the square square wave $\phi_1$ and the triangular wave $\phi_3$ to the one electrode 33, and another composite wave $\phi_2+\phi_3$ of the square wave $\phi_2$ and the triangular wave $\phi_3$ to the other electrode 34. When the zoom lens is positioned at the standard focal length S, the capacitors 36 and 37 are equal in capacitance to each other and the square waves $\phi_1$ and $\phi_2$ which are unbalanced components compensate each other so that only the triangular wave $\phi_3$ component appears on the electrode 35. Then, the comparator 63 of the sampling pulse generating circuit 60 generates a normal output when the voltage of the triangular wave $\phi_3$ is not lower than 0 V and generates an inverse output when the voltage of the triangular wave $\phi_3$ is not higher than 0 V. The monostable multivibrator 64 outputs a sampling pulse $P_s$ when the output of the comparator 63 changes from the normal one into the inverse one, and from the inverse one to the normal one.

Alternatively, when the zoom lens is positioned at the telephoto focal length T, the opposite area of the capacitor 36 is increased while that of the capacitor 37 is decreased, so that the capacitance of the capacitor 36 is larger than that of the capacitor 37. Consequently, the voltage which appears on the electrode 35 so as to be applied to the comparator 63 is the triangular wave $\phi_3$ which is strongly affected by the square wave $\phi_1$. In this case, therefore, the time of zero crossing of the voltage of the triangular wave $\phi_3$ at which the comparator 63 turns from the inverse output to the normal one or from the normal one to the inverse one becomes earlier than in the case of the standard focal length S, so that the time at which the sampling pulse $P_t$ is put out from the monostable multivibrator 64 becomes earlier.

On the contrary, when the zoom lens is positioned at the wide-angle focal length W, the opposite area of the capacitor 36 is decreasing while that of the capacitor 37 is increased, so that the capacitance of the capacitor 36 is smaller than that of the capacitor 37. Consequently, the voltage which appears at the electrode 35 so as to be applied to the comparator 63 is the triangular wave $\phi_3$ which is strongly affected by the square wave $\phi_2$. In this case, therefore, the time of zero crossing of the voltage of the triangular wave $\phi_3$ at which the comparator 63 turns from the inverse output to the normal one or from the normal one to the inverse one becomes later than in the case of the standard focal length S, so that the time at which the sampling pulse $P_w$ is put out from the monostable multivibrator 64 becomes later.

In operation of the apparatus of the embodiment, first, the length is set to a desired position by the length setting means 67 so that the level of the variable voltage source 66 is made to be a voltage value corresponding to the set length.

Figure 6:
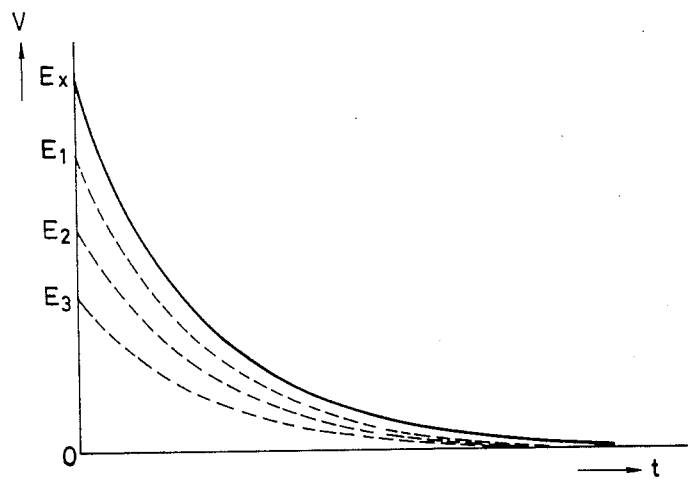
FIG. 6 is a diagram showing the relation between time and a voltage of the discharge circuit.
Figure 7:
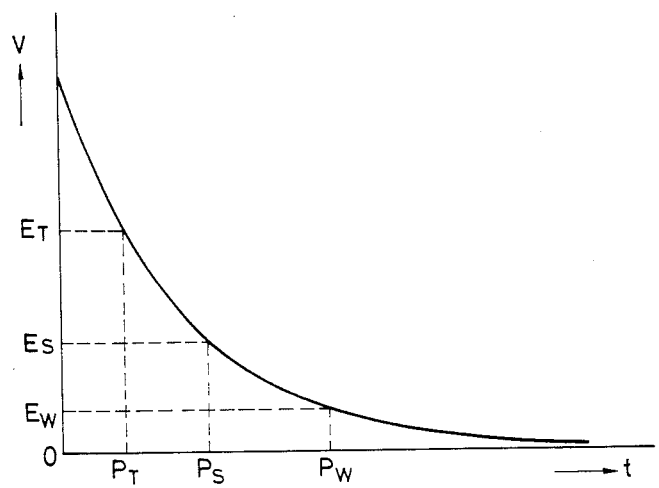
FIG. 7 is a diagram of the output of the sample-and-hold circuit.

Then, whenever the timing pulse $\phi_4$ of the reference signal generating circuit 51 is generated, the switch 71 of the charge-and-discharge circuit 70 is closed to charge the capacitor 72, and when the switch 70 is opened the electrical charge stored in the capacitor 72 is discharged through the RC circuit constituted by the capacitor 72 and the resister 73 so that the terminal voltage of the capacitor 72 decreases in accordance with an exponential function as shown in FIG. 6. On the other hand, in the sample-and-hold circuit 75, the switch 76 is closed by the sampling pulse from the sampling pulse generating circuit 60. The terminal voltage of the capacitor 72 at that time as shown in FIG. 7 is held by the holding capacitor 77, and put out from the output terminal of the operational amplifier 78, which forms the voltage follower circuit, so as to be supplied to the normal input terminal of the operational amplifier 82.

At that time, a relatively high voltage is applied to the holding capacitor 77 in the case of the telephoto focal length T where the sampling pulse PT is generated early after the initiation of discharge of the Capacitor 72, and, on the contrary, a relatively low voltage is applied to the holding capacitor 77 in the case of the late sampling pulse $P_w$. In the case of the sampling pulse $P_s$ for the standard focal length S, an intermediate one between the voltages in both the aforementioned cases is applied to the holding capacitor 77.

Turning to the master lens section B. when the master lens section B is located in its center position, the electrodes 38 and 39 are equal to each other in opposite areas to the electrode 40, so that the variable capacitors 41 and 42 are equal to each other in capacitance. When the master lens section B moves forward, the opposite area of the electrode 38 to the electrode 40 increases, while the opposite area of the electrode 39 to the electrode 40 decreases, so that the capacitance of the variable capacitor 41 is larger than that of the variable capacitor 42. On the contrary, when the master lens section B moves backward, the opposite area of the electrode 38 to the electrode 40 decreases, while the opposite area of the electrode 39 to the electrode 40 increases, so that the capacitance of the variable capacitor 41 is smaller than that of the variable capacitor 42. Similarly to the case of the zoom lens section A, the position of the master lens section B is converted into the change of the variable capacitors 41 and 42, that is, the position of the master lens section B is converted into a voltage value, Then, the voltage representing the position of the zoom lens section A is supplied to the normal input terminal of the operational amplifier 82 and the output voltage of the sensor 83 representing the position of the master lens section B is supplied to the inverse input terminal of the operational amplifier 82 so that the master lens section B is moved in the direction, forward or backward, so as to make the difference between both the inputs to the operational amplifier 82 zero to thereby attain focusing.

The reason why the RC circuit is used as well as why the cam mechanism C of the zoom lens section A is set in accordance with a logarithmic function are as follows. Assuming now that x, a and f represent an amount of extension of the lens, a subject distance and a focal length respectively, the following equation is obtained.

$$x = f^2/a \qquad (1)$$

In the zoom lens in which the rotating angle $\theta$ of the zoom lens 14 is set to be a logarithmic function of the focal length f, the following equation is obtained.

$$\theta = F \log f - g$$

$$\text{or } \theta = F \ln f - G \qquad (2)$$

where F, F' and G are constants. The equation (2) is transformed as follows $$\ln f = (\theta + G)/F \qquad (3)$$

Therefore, the following equation is obtained.

$$f = e^{(\theta + G)/F} \qquad (4)$$

From the equations (1) and (4), $$\begin{aligned} x &= (1/a) \cdot e^{2(\theta+G)/F} \\ &= (1/a) \cdot e^{2B/A'} \cdot e^{2\theta/A'} \end{aligned} \qquad (5)$$

On the other hand, in the RC discharge circuit, discharge voltage Ex after t seconds is expressed by, $$E_x = E_0 \cdot e^{-t/CR} \qquad (11)$$

where $E_0$ is an initial value of the discharge voltage.

The charge voltage in the RC charge circuit after t seconds is expressed by, $$\begin{aligned} E_x &= E_0 \cdot (1 - e^{-t/CR}) \\ &= E_0 - E_0 \cdot e^{-t/Cr} \end{aligned} \qquad (12)$$

Substituting $(E_0 - E_x = E_x)$ in the equation (12), the following equation is obtained.

$$E_x = E_0 \cdot e^{-t/CR} \qquad (13)$$

The equations (11) and (13) can be expressed by similar functions. Therefore, from the formula (5) and (13), the amount of extension of the lens can be calculated as a change of the terminal voltage $E_x$, if the respective constants are set so that the following equation are true.

$$E_0 = (1/a) \cdot e^{2G/F}$$

and $$-\frac{t}{CR} = \frac{2\theta}{F}$$

Although the embodiment has been described as to the case where the sensor 83 is arranged to determined the voltage on the basis of the discharge time of the capacitor 72 by using the charge-and-discharge circuit 70, the sensor 83 is not limited to such a structure but may be arranged so that the voltage is obtained by the capacitance of the variable capacitors 40 and 41.

Further, if the length setting means 67 is replaced by a rangefinder, an automatic focusing operation can be achieved.

Moreover, the charge-and-discharge circuit 70 is not limited to that of the type as shown in the drawing, but the same operation can be obtained even if any other well known RC charge-and-discharge circuit is employed.

Figure 8:
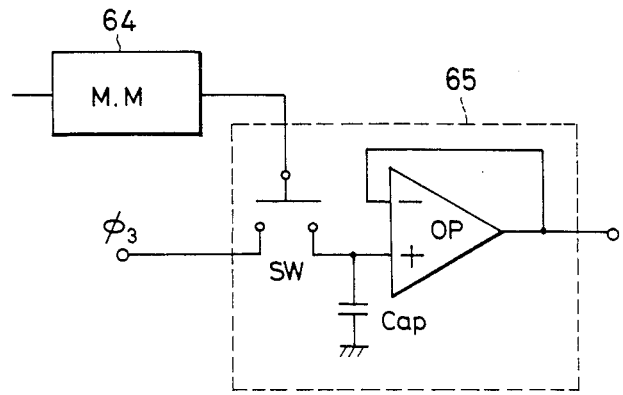
FIG. 8 is a diagram showing a zoom lens focusing apparatus according to another embodiment of the present invention.

Further, according to the present invention a sample-and-hold circuit 65 shown in FIG. 8 may be employed as a position information converter circuit. The sample-and-hold circuit 65 is constituted by an operational amplifier OP having an inverse input terminal connected to an output terminal thereof in the form of a short circuit and having a normal input terminal connected to the ground through a capacitor Cap, and a switch SW which is normally opened and is closed by the aid of the monostable multivibrator 64 which is connected to the operational amplifier 63 and is motive at the time of a leading edge thereof so that the sample-and-hold circuit 65 receives the triangular wave $\phi_3$.

The monostable multivibrator 64 outputs a pulse signal at the time of the leading edge of the comparator 63 so that the switch SW is closed, and the voltage of the triangular wave $\phi_3$ of the moment is then sampled and held by the capacitor Cap. At the same time, the voltage of the triangular wave $\phi_3$ is outputted from the operational amplifier OP which forms a voltage follower circuit whereby the position of the object to be detected is detected on the basis of the voltage thus outputted.

As described above, in the zoom lens focusing apparatus shown in FIG. 1, the ground voltage, that is, 0 V corresponds to a reference position of extension of the master lens. In the case where the master lens is located at the reference position, the distance to the object is focused on the infinity ($\infty$). The zoom lens focusing apparatus in FIG. 1 requires a process in which the reference position of the extension is manually adjusted in the direction of optical axis.

Figure 9:
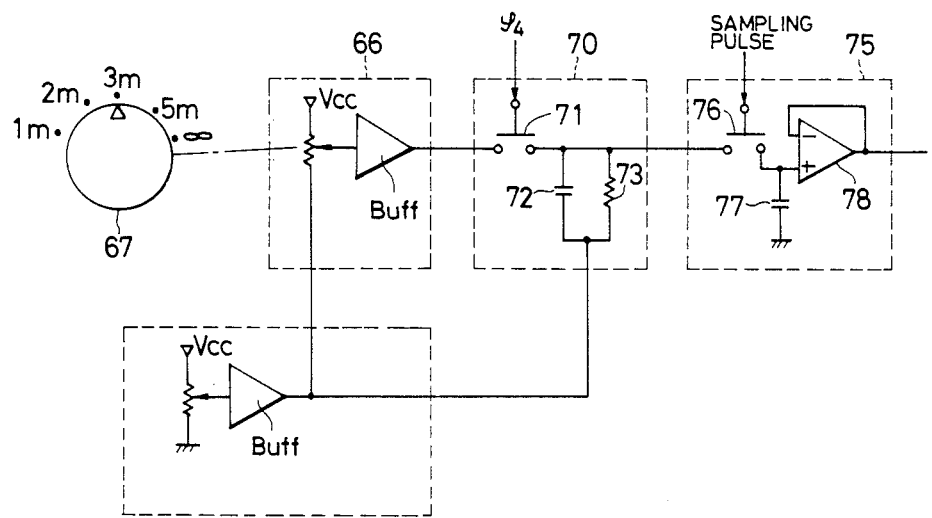
FIG. 9 is a diagram showing a zoom lens focusing apparatus according to a further embodiment of the present invention.

On the other hand, a zoom lens focusing apparatus is shown in FIG. 9 in which the reference position of extension of the master lens is electrically adjustable. That is, the reference position is simply adjusted by the adjustment of a variable resistance in a reference position setting circuit.

According to the present invention, the electrical charge stored in the charge-and-discharge circuit is discharged, and the discharge time is changed by a sampling pulse generated from the sampling pulse circuit at a point of time depending on the position of the lens, so that a voltage according to the lens position is produced. Accordingly, it is possible to provide a focusing apparatus which is simple in structure, inexpensive in cost, and accurate in operation.

What is claimed is:

1. A zoom lens focusing apparatus comprising:
   a zoom lens section including a cam mechanism arranged to be rotatable to thereby move a movable lens forward or backward, and a zoom ring for rotating said cam mechanism, said cam mechanism being arranged so that a rotating angle of said zoom ring is a logarithmic function of a focal length of the zoom lens section;
   a master lens section provided with a driving section for moving a movable lens therein forward or backward;
   charge-and-discharge circuit means;
   voltage source means for applying a charging voltage to said charge-and-discharge circuit means related to the distance of a subject to be photographed from the apparatus;
   sampling pulse generating means for producing a sampling pulse at times which change corresponding to the position of said zoom ring; and
   sampling-and-hold circuit means for holding an output voltage of said charge-and-discharge circuit means in response to the time of occurrence of said sampling pulse and for controlling said drive section of said master lens section by said output of said charge-and-discharge circuit means.

2. A zoom lens focusing apparatus as claimed in claim 1, further comprising:
   length setting means for setting a length to a desired position;
   variable voltage source means having a reference voltage terminal a voltage of which is varied in response to an output of said length setting means;
   common voltage source means which is commonly connected to both of said reference voltage terminal of said variable voltage source means and a reference voltage terminal of said charge-and-discharge circuit means, in which the voltage of said common voltage source means is varied to adjust a reference position of said master lens.

3. A zoom lens focusing apparatus comprising:
   a reference signal generation circuit means which superimposes a triangular wave on two square waves different in polarity from each other to generate two reference signals different from each other;
   capacity change unit means, which comprises two reference signal electrodes each having an electrode surface, which are located in the direction of displacement of an object to be detected and to which each of said two reference signals are supplied, respectively, and a detection signal electrode having an electrode surface faced with said electrode surface of each of said reference signal electrodes, for changing a capacity between said reference signal electrodes and said detection signal electrode in response to the displacement of the object to be detected;
   comparator circuit means for comparing an output of said detection signal electrode with a setting value; and
   position information converter circuit means for converting an output of said comparator circuit means into a position information.

* * * * *